United States Patent [19]

Baer et al.

[11] Patent Number: 5,072,613

[45] Date of Patent: * Dec. 17, 1991

[54] METHOD FOR EVALUATION OF FLUID FLOW WITHIN A SIMULATED COMBUSTION CHAMBER

[75] Inventors: Patrick H. Baer, Royal Oak; Timothy F. Connolly, Sterling Heights; Gerald P. Kopinski, Farmington Hills; Curtis E. Rowley, Royal Oak; Anthony W. Senkow, Yale, all of Mich.

[73] Assignee: Chrysler Corporation, Highland Park, Mich.

[ * ] Notice: The portion of the term of this patent subsequent to Mar. 5, 2008 has been disclaimed.

[21] Appl. No.: 587,823

[22] Filed: Sep. 24, 1990

Related U.S. Application Data

[62] Division of Ser. No. 450,888, Dec. 14, 1989, Pat. No. 4,996,875.

[51] Int. Cl.$^5$ ............................................ G01M 15/00
[52] U.S. Cl. .................................................. 73/119 R
[58] Field of Search ............... 73/119 R, 119 A, 865.6

[56] References Cited

U.S. PATENT DOCUMENTS

| | | | |
|---|---|---|---|
| 3,081,623 | 3/1963 | Domeisen | 73/119 A |
| 4,031,759 | 6/1977 | Jones | 73/119 A |

FOREIGN PATENT DOCUMENTS

| | | | |
|---|---|---|---|
| 1305425 | 4/1987 | U.S.S.R. | 73/119 A |
| 1370270 | 1/1988 | U.S.S.R. | 73/119 R |
| 1072561 | 6/1967 | United Kingdom | 73/119 A |

Primary Examiner—Robert R. Maevis
Attorney, Agent, or Firm—Kenneth H. MacLean

[57] ABSTRACT

The invention concerns a method for evaluating port design of an engine cylinder head by viewing patterns of fluid flow therefrom into a transparent chamber simulating an engine combustion chamber. A permeable member in the chamber simulates the position of a piston in a related engine and allows a continuous flow to be generated through the chamber. Lightweight members are deposited within the chamber to be visually observed as they move with the fluid flow in the chamber.

6 Claims, 2 Drawing Sheets

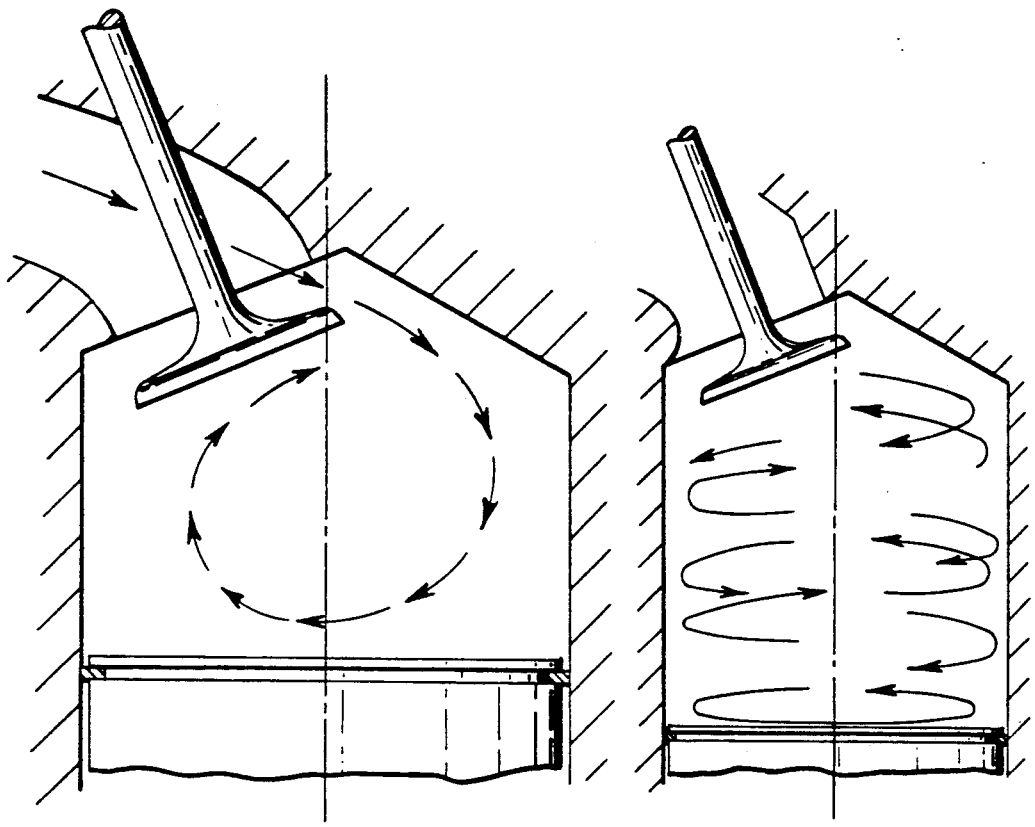
FIG. 2.
(Prior Art Flow Pattern)
FIG. 5.
(Prior Art Flow Pattern)
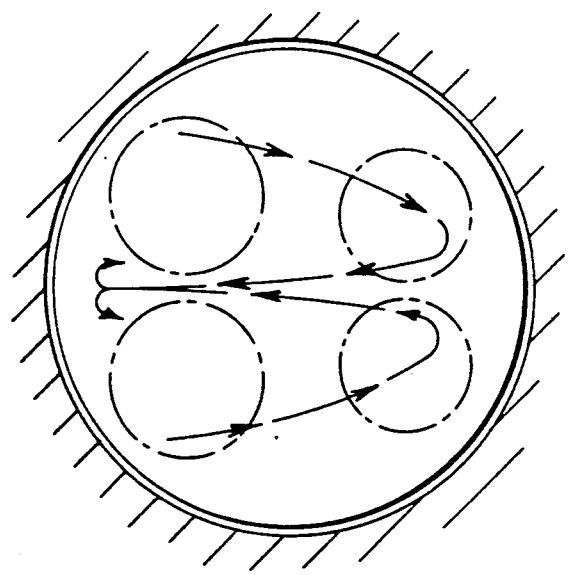
FIG. 4.
(Prior Art Flow Pattern)
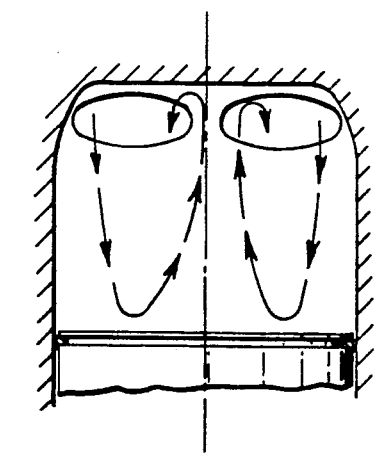
FIG. 3.
(Prior Art Flow Pattern)

METHOD FOR EVALUATION OF FLUID FLOW WITHIN A SIMULATED COMBUSTION CHAMBER

RELATED APPLICATIONS

This application is a divisional of U.S. Pat. Application Ser. No. 07/450,888, filed Dec. 14, 1989, now U.S. Pat. No. 4,996,875, entitled "Apparatus and Method of Fluid Flow Within a Combustion Chamber."

BACKGROUND AND SUMMARY OF THE INVENTION

The present invention relates to design of inlet valve shrouding of a cylinder head of an internal combustion engine and, more particularly, to a method for analyzing particular designs of the inlet valve shrouding of particular cylinder heads.

In designing cylinder heads for combustion chambers of internal combustion engines, it is desirable to know the type of fluid flow pattern present within the cylinder while the cylinder valves are open and the cylinder is being filled with a fluid stream of air and fuel. The type of fluid flow pattern aids the designer in determining optimum characteristics for that particular combustion chamber and cylinder head. Also, the optimum fluid flow pattern aids the engine in producing more power and in reducing emissions.

Generally, two types of fluid flow patterns exist in combustion chambers of automotive internal combustion engines. One type is what is known as a swirl pattern. The fluid flow in a swirl pattern travels along the combustion chamber wall in an arcuate path substantially about the axis of the cylinder bore. The fluid flow moves in a helical pattern, as seen in FIG. 5.

The second type of fluid flow pattern is what is known as tumble flow. Tumble flow follows a substantially arcuate path substantially transverse to the axis of the cylinder bore, as shown in FIGS. 2–4.

Tumble flow is believed to offer significant advantages over other types of flow in that it promotes mixing of fuel and air within the combustion chambers which reduces the ignition delay period. As a result, tumble flow promotes combustion stability within the combustion chambers. Additionally, tumble flow provides for better emission characteristics and results in improved engine operating economy. Thus, it is desirable to have combustion chambers which exhibit tumble flow characteristics.

With the advantages provided by tumble flow, the question arises as to why all combustion chambers do not have tumble flow. It is believed that equipment and techniques do not exist which enable viewing of the flow patterns within a combustion cylinder to enable determination of the flow patterns within the combustion cylinder.

Therefore, it is desirous to have techniques and equipment which enables a determination of whether or not tumble flow will exist in a combustion chamber for a particular cylinder head. Also, the technique should provide information useful in the design of the cylinder heads which produce tumble flow. The technique should enable evaluation of tumble flow in the combustion cylinder in an attempt to optimize the flow pattern. Accordingly, it is an object of the present invention to provide the art with such a technique an procedure.

The present invention provides the art with a technique or procedure which enables viewing of flow patterns within a simulated combustion chamber by an engine designer. The present invention provides information useful in designing inlet valve ports of cylinder heads which produce tumble flow in their respective combustion cylinders. The present invention enables adjustment of a simulated piston to simulate various positions of a piston during the stroke of the piston in the simulated combustion chamber to enable analysis of the flow patterns within the combustion chamber cylinder.

From the following detailed description taken in conjunction with the accompanying drawings and claims, other objects and advantages of the present invention will become apparent to those skilled in the art.

BRIEF DESCRIPTION OF THE DRAWINGS

FIG. 2 illustrates a cross-sectional view of a combustion chamber with a cylinder bore, piston and cylinder head illustrating a tumble type flow from a side elevation direction.

FIG. 3 is a cross-sectional view of the combustion chamber shown in FIG. 2 but illustrating tumble flow in a side elevation view 90° with respect to FIG. 2.

FIG. 4 is a cross-sectional view of the combustion chamber of FIG. 2 illustrating a bottom planar view of the tumble flow.

FIG. 5 is a cross-sectional view of a combustion chamber with a cylinder bore, piston and cylinder head illustrating a swirl type flow from a side elevation direction.

DETAILED DESCRIPTION OF THE PREFERRED EMBODIMENT

Figure 1:
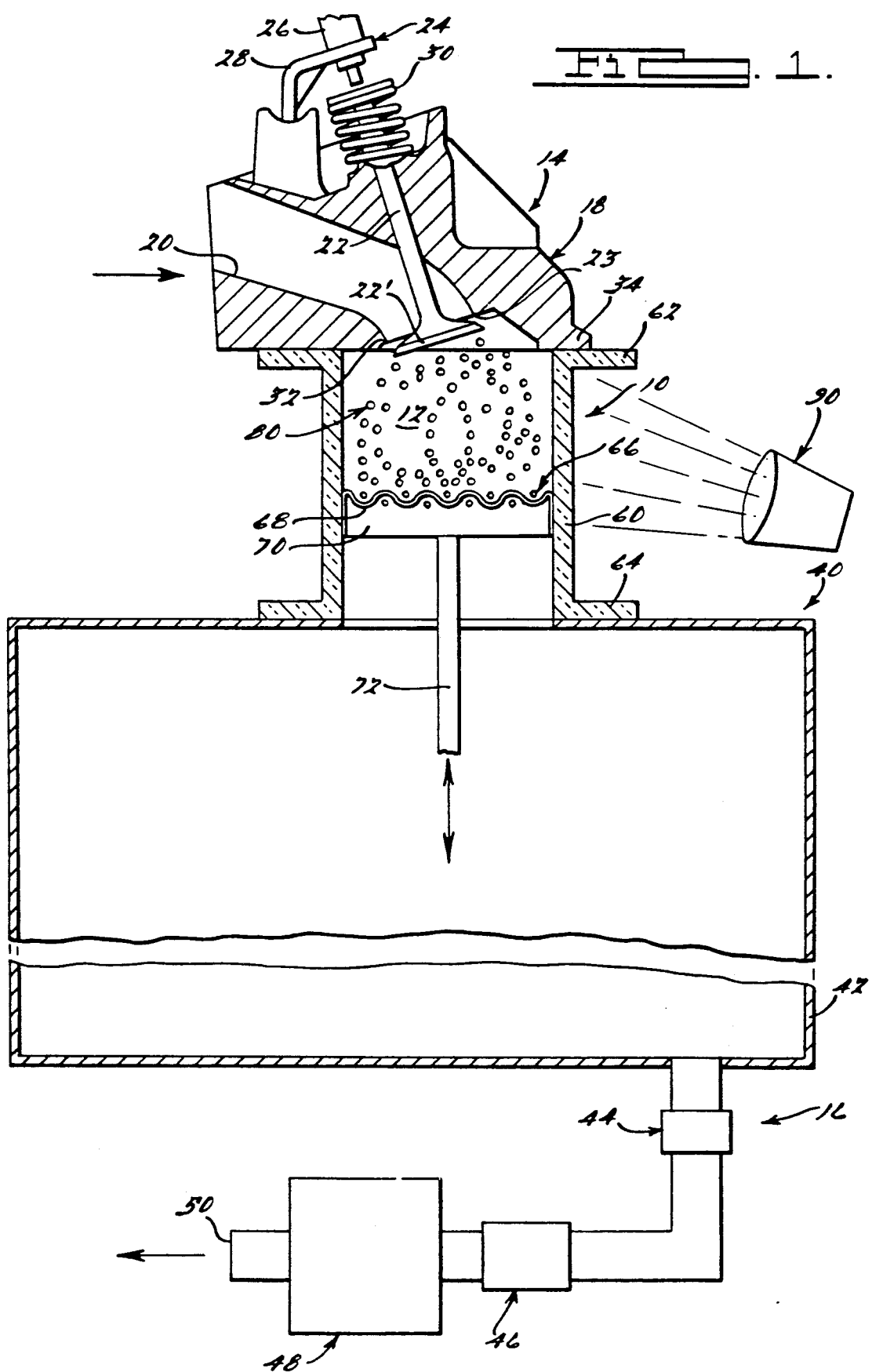
FIG. 1 is a partially cross-section view of a equipment for practicing the method of the present invention.

Turning to the Figures, particularly FIG. 1, equipment to simulate a combustion chamber and fluid flow patterns in the chamber is illustrated. Generally, the equipment includes a tubular member 10 forming an interior or simulated combustion chamber 12, a mechanism 14 for directing fluid such as air into the chamber 12 and a mechanism 16 for discharging the fluid from the chamber 12.

The mechanism 14 for enabling fluid to enter into the chamber is preferably an engine cylinder head 18 modified as further explained hereinafter. As shown in the view, the cylinder head 18 includes one or more inlet passages or ports 20, a valve 22 for each port and a mechanism 24 for adjusting a valve 22 within the port 20. In a normal engine, the mechanism 24 would consist of a valve train including a camshaft and perhaps rocker arms, lash adjusters, etc. Since these items are unnecessary in this apparatus, the cylinder head 18 is modified as follows.

The adjustment mechanism 24 generally includes a rotatable member 26 which may be adjusted to change the distance the valve 22 travels away from its seat 23. Preferably, the rotatable member 26 is threaded and moves in a threaded bore to change the distance the valve 22 moves. A bracket 28 mounts the rotatable member 26 to enable the rotatable member 26 to contact the valve stem 25. The rotatable member 26 overcomes the force of the valve spring 30 to enable the valve 22 to move away from its seat 23. The rotatable member 26 is finely adjustable in very small increments to control the opening distance between the valve 22 and its seat 23, which is commonly known as valve lift.

In addition to the inlet ports and valves, the head 18 normally includes at least one exhaust port and an exhaust valve. Since the subject procedure or method is to determine inlet fluid flow, the exhaust ports and valves are not shown. During practice of the method, the exhaust ports are maintained closed by a closed operative position of the exhaust valves. Alternately, a head 18 could be used that did not include any exhaust ports or valves.

The cylinder head with a valved inlet port 20 generally includes more than one inlet passages. In a three or four valve type of head, two inlet valve ports would be present. The present invention enables a working simulation of combustion chambers and the effect of inlet port design of cylinder heads to aid in optimizing the fluid flow volumes and patterns. The lift of the intake valve of the particular head can be adjusted by the adjustment mechanism 24. Ordinarily, the length and configuration of the short side, designated with reference numeral 32, of the inlet port will effect fluid flow patterns within the chamber 12. Generally, a short side having a smaller radius encourages tumble type flow patterns at relatively low valve lifts. A short side of the inlet port with a larger radius will discourage tumble flow patterns, particularly at low valve lifts.

The cylinder head 18 includes a peripheral edge or lip portion 34 to enable the head 18 to rest against or seat on the end of the tubular member. The lip 34 could include apertures to enable fasteners to pass therethrough to secure the head 18 to the chamber forming member.

The mechanism 16 to generate fluid flow through the tubular member is generally comprised of a flow bench 40 which includes an air box 42, a flow control valve 44, a flow meter 46, and a blower 48. The flow bench 40 enables the chamber forming member to be secured thereto to provide a support for the head 18. The flow control valve 44 controls the air flow through the chamber 12 and through the system. The flow meter 46 provides a device to measure the quantity of flow moving through the head 18 and the chamber 12. The flow control valve 44 may be adjusted in response to the flow meter to provide a desired flow through the chamber 12. The blower 48 draws fluid through the head 18, the chamber 12, the air box 42 and eventually exhausts the fluid out exhaust port 50. Thus, the blower 48 creates the pressure differential between the inlet port 20 and exhaust port 50 to draw fluid through the system.

The simulated combustion chamber 12 includes a transparent cylindrical tube 60. The tube 60 may have radially outward extending flanges 62 and 64 to enable securement of the head 18 and flow table 40, respectively, with the cylinder tube 60. The transparency of the cylinder tube 60 enables the operator to view within the cylinder tube 60. The cylindrical tube 60 may be sized to correspond with desired sizes of particular vehicle combustion chamber cylinders which are to be tested.

Within the cylinder tube 60 is a member 66 which simulates a particular position of a piston within an engine combustion chamber. The member 66 includes a screen 68 and an outer peripheral band 70. The screen 68 enables the fluid flow to pass through the member 66. The member 66 is vertically adjustable within the cylinder 60 by rod 72. The rod 72 enables the member 66 to be positioned at any desired vertical position along the cylinder tube 60. Thus, the member 66 may simulate different positions of the piston which correspond to a given valve lift of a corresponding engine to which the equipment relates.

A plurality of lightweight members 80 are positioned within the cylinder tube 60 above the member 66 within the space between the member 66 and the head 18. The lightweight members 80 travel in the fluid stream entering from the port 20. The lightweight members 80 travel along and in the path defined by the portion of the fluid stream maintained in said cylinder tube 60 to provide visual tracking of fluid flow entering tube 60 and hence simulate patterns of inlet flow into a combustion chamber cylinder of an internal combustion engine.

The members 80 are generally formed from a foam material and are substantially spherical in shape. The lightweight members 80 are either coated with a fluorescent coating or paint or formed from a fluorescent foam material to enable better visualization within the chamber 12.

An illumination mechanism 90 is utilized to provide better viewing of the lightweight members 80 as they move with the flow patterns in the simulated combustion chamber 12. The illumination mechanism 90 is generally an ultraviolet light, black light or the like to provide light rays which cause the colored or fluorescent, lightweight members thereby providing high visibility of the lightweight members 80.

In use, the blower 48 is energized to create a pressure differential across the inlet port 20 and the exhaust port 50. The valve or valves 22 are opened a desired distance from closed. Fluid is drawn through the port 20 past the valve 22 and into the chamber 12. As the fluid is drawn past the valve 22 into the chamber 12 portions will circulate above the screened member 66 within chamber 12 before being drawn through the screen 68 in member 66. The lightweight members 80 are drawn into the fluid path adjacent the inlet port as the fluid enters the chamber 12. The particles are suspended and carried along by the fluid stream, as indicated in FIG. 1. The particular fluid path in the chamber 12 is dependent upon the size of the cylinder, position of the member 66, the head porting design, and the valve lift at a particular air flow rate through the system. The valve lift may be adjusted by the mechanism 24 to provide the particular head 18 with alternate valve lifts to optimize the flow path within the cylinder tube 60.

The illumination mechanism 90 is used to provide better viewing of the lightweight fluorescent members 80 within the chamber 12. Generally a video camera or the like is provided to record a visual impression of the flow path or pattern within the chamber 12. From the information provided by the visualization of the flow pattern, the designer can further work to optimize the above characteristics to provide optimum tumble flow.

FIGS. 2–4 illustrate desired tumble flow path within a combustion chamber. Generally, tumble flow is in an arcuate or circular path transverse to the axis of the cylinder. The tumble flow pattern provides the internal combustion engine with the above described characteristics.

While the above describes a preferred embodiment of the present invention, it will be understood that modifications, variations and alterations may be made to the present invention without deviating from the scope and fair meaning of the subjoined claims.

What is claimed is:

1. A method of flow testing the design of a valved cylinder head for an internal combustion engine, and particularly the air intake portion of the valved cylinder head comprising:

providing a transparent sleeve to simulate a cylinder bore of an engine and to partially define a simulated combustion chamber, said sleeve having two ends, one end covered by the valved cylinder head a second end forming an air outlet for a flow of air through the sleeve, providing a permeable member within said sleeve at an axial position in the sleeve corresponding to a position of a piston in an actual engine which is conforms to a selected valve opening in the cylinder head whereby said member is substantially permeable to fluid flow from the one end to the other of said sleeve, positioning a plurality of lightweight members in said space in the sleeve downstream of said one end and the cylinder head and upstream of the permeable member;

providing said valved cylinder head with a particular configuration of an inlet port and intake valve opening for evaluation of the effects on fluid flow therefrom into the sleeve, passing a flow of fluid through said valved inlet port into said transparent sleeve and from the sleeve's second end whereby one or more types of fluid flow patterns are generated in said space in said sleeve, said fluid flow moving said lightweight members in said one or more types of fluid flow patterns;

identifying the type of fluid flow pattern in the simulated combustion chamber by visually observing patterns of the movement of the lightweight members in the fluid flow stream; and evaluating the effects on flow patterns caused by specific configurations of the inlet port design of selected successive cylinder heads from one or more viewed patterns of the movements of the lightweight members.

2. The method according to claim 1 further comprising comparing said one or more flow paths with other known flow paths to optimize flow turbulence.

3. The method according to claim 1 further comprising illuminating said lightweight members for enhancing viewing of said lightweight members.

4. The method according to claim 1 further comprising altering inlet port design of successive ones of said valved cylinder heads to be evaluated to optimize performance.

5. The method according to claim 1 wherein said valved cylinder head includes said inlet valve associated with said inlet port and said method further comprises adjusting the lift position of said valve from its closed position to achieve a tumble flow pattern in said sleeve for said valved cylinder head to be evaluated.

6. A method of testing a valved cylinder head design comprising:

providing a transparent sleeve for simulating an engine cylinder bore for partially defining a combustion chamber, said sleeve having two ends, means for exhausting fluid from said sleeve, said means for exhausting fluid coupled with a second end of said sleeve, a fluid flow permeable member positioned axially across said sleeve corresponding to a position of a piston in an actual engine which conforms to an appropriate corresponding valve opening in the valved cylinder head, said permeable member allowing fluid flow to substantially pass therethrough, and lightweight members in said sleeve;

providing a valved cylinder head including inlet valve porting to evaluate the effect of inlet port design of fluid flows, coupling the valved cylinder head with a first end of said sleeve and including means for enabling fluid entry through said inlet valve port into said sleeve and including an inlet valve associated with said inlet port for selectively adjusting the open position of said inlet valve from closed to more opened to achieve a tumble flow pattern in said sleeve for said valve cylinder head to be evaluated;

generating fluid flow through said inlet port into said transparent sleeve so as to produce one or more alternate flow pattern streams in said sleeve, said flow moving said lightweight members in one or more fluid flow pattern streams; and evaluating the performance of the inlet valve portion of the selected valved cylinder head from the one or more viewed paths of the lightweight members.

* * * * *